Patented Oct. 24, 1950

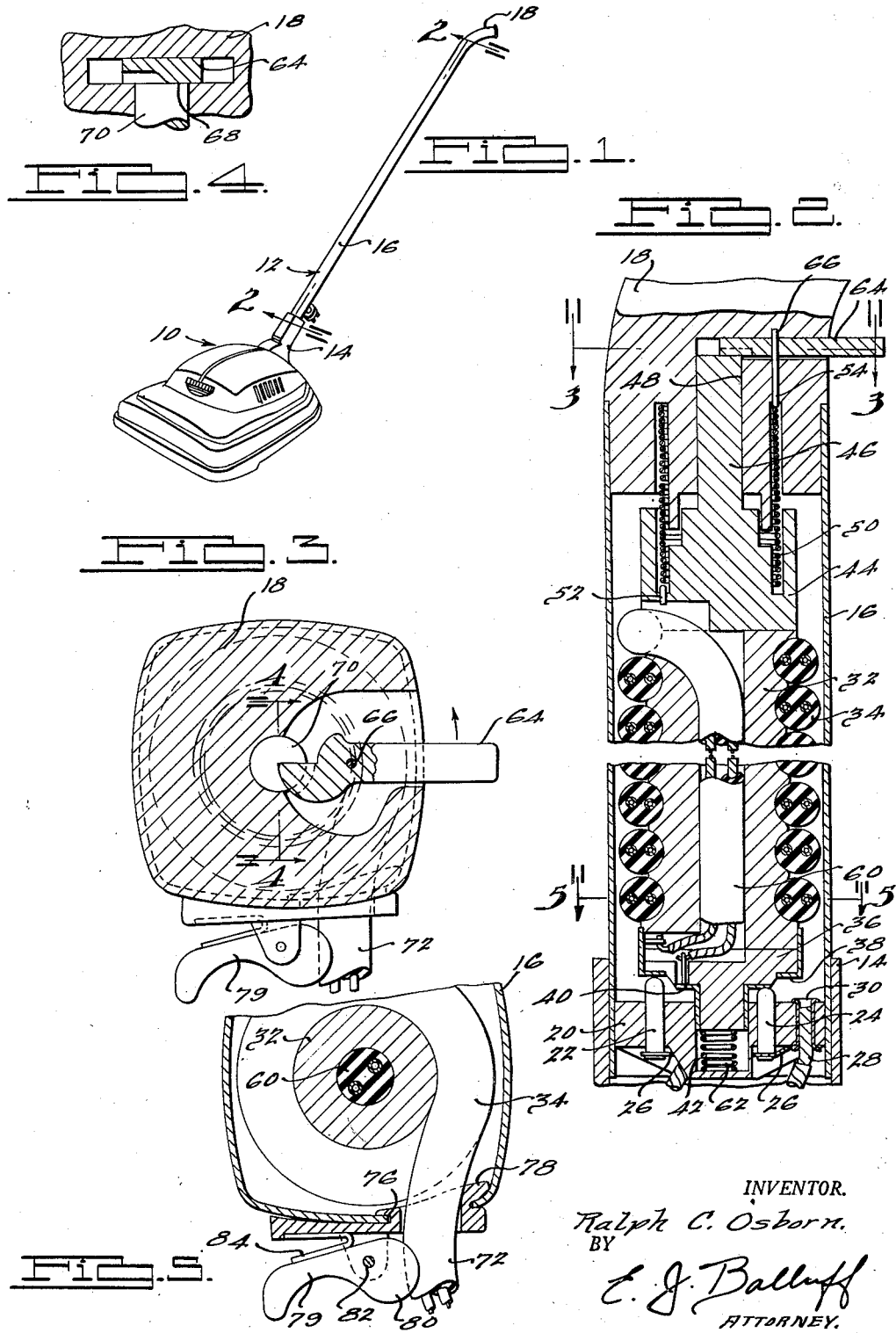

2,527,486

UNITED STATES PATENT OFFICE 2,527,486

HANDLE, CORD REEL, AND SWITCH ASSEMBLY

Ralph C. Osborn, Bloomington, Ill., assignor to Eureka Williams Corporation, a corporation of Michigan Application January 16, 1946, Serial No. 641,473

9 Claims. (Cl. 191—12.2)

This invention relates to vacuum cleaners and has particular reference to a new and improved construction and arrangement of a handle therefor embodying an automatic cord reel and switch.

The long current conducting cord attached to vacuum cleaners has always presented a problem in connection with the use of the machine. Many suggestions, including the use of automatic cord reels, have heretofore been made, but a serious objection to such arrangements has been that the cord reel was bulky and expensive and was of such a nature that it impaired the appearance and utility of the machine due to the arrangements suggested to incorporate such a reel into the machine. According to the present invention, I have provided a handle assembly, including a cord reel and switch in which the cord reel extends along the axis of the handle and is housed by the tube which defines the handle.

Principal objects of the invention, therefore, are to provide:

A suction cleaner embodying new and more efficient arrangements for handling the cord thereof;

A handle and cord reel and switch assembly;

A new and improved cord reel for use in connection with the vacuum cleaner or similar machine.

Other and further objects of the invention will be apparent from the following description and claims and will be understood by reference to the accompanying drawings, of which there is one sheet, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a perspective view of a cleaner embodying the invention;

Fig. 2 is an enlarged fragmentary sectional view taken generally along the line 2—2 of Fig. 1;

Fig. 3 is an enlarged sectional view taken generally along the line 3—3 of Fig. 2;

Fig. 4 is a fragmentary sectional view taken along the line 4—4 of Fig. 3; and

Fig. 5 is a sectional view taken along the line 5—5 of Fig. 2.

As shown in Fig. 1, a cleaner embodying the invention comprises a casing 10 having a pivoted handle 12. The casing 10 comprises an electric motor driven suction cleaner, including an electric motor, a fan driven thereby and a rotary brush also driven by the motor, as is well understood in the art. The handle 12 includes a socket member 14 pivotally attached to the casing 10, a stem 16 and a hand grip 18. The stem 16 is provided by a tubular member, such as a piece of tubing, one end of which is seated and secured in a socket provided by the socket member 14. The hand grip 18 is secured in the other end of the tube 16. A plug 20 is rigidly secured in one end of the tube 16.

Contact pins 22 and 24 are resiliently mounted in the plug 20. Each of the pins 22 and 24 is slidable in a hole in the plug 20 and is mounted on the free end of a spring member 26 which forms part of a current conducting path between a pin and the end 28 of a current conducting lead to the motor. Each of the leads 28 is secured in a rivet 30 which clamps one end of the spring member 26 in position on the plug 20. The plug 20 and the pins 22 and 24 thus provide a terminal in the handle to which the current conducting leads of the motor are attached.

The cord reel includes a roller 32, the outer surface of which is spirally grooved so as to permit the flexible current conducting cord 34 to be uniformly and efficiently coiled thereon. The roller 32 includes an end plug 36 having slip rings 38 and 40 secured thereto. The slip ring 40 includes a cylindrical portion which is journaled in a bore 42 in the plug 20, thereby to provide a rotary support for one end of the roller 32. The other end of the roller includes a plug 44 having a shaft extension 46 which is rotatably mounted in a bore 48 in the hand grip 18 so as to provide a rotary mounting for the upper end of the roller 32. Thus the roller 32 is mounted for rotary movement about an axis which is parallel to or coaxial with the longitudinal axis of the handle 12. A torsion spring 50 arranged in annular grooves in the plug 44 and the hand grip 18 has one end 52 anchored to the plug 44 and the other end 54 anchored in a bore in the hand grip 18 and biases the roller 32 to a position which may be designated as its wound position, that is, one in which the roller 32 has the cord 34 fully wound thereon, although it is possible that the cord 34 may be of such length that a portion thereof will not be wound on the roller 32, but I have found, however, that in a vacuum cleaner with a handle of conventional length and cross section that it is possible to accommodate a cord of sufficient length for the cleaner on a roller which can be accommodated in the space available between the pivotal mounting of the handle on the cleaner and the hand grip therefor.

The contact pins are arranged so that the pin 24 engages the slip ring 40 and the pin 22 engages the slip ring 38. The end 60 of the current conducting cord 34 extends through a passage formed interiorly of the roller 32. One of the current conductors of the cord 34 is electrically connected to the slip ring 38 while the other is electrically connected to the slip ring 40. When the pins 22 and 24 are in engagement with the slip rings 38 and 40, the circuit to the motor of the cleaner is closed. The roller 32, in addition to being rotatably mounted, is slidably mounted for axial movement so as to permit the slip rings 38 and 40 to move out of engagement with the contact pins 22 and 24. A spring 62 confined between the plug 20 and the end of the plug 36 biases the roller 32 away from the pins 22 and 24.

A lever 64 pivoted on a pin 66 arranged in the handle 18 has a cam surface 68 arranged to engage the end 70 of the shaft extension 46 so as to hold the roller 32 in position where the slip rings 38 and 40 thereof will be in engagement with the pins 22 and 24. However, by shifting the lever 64, portions 68 thereof may be moved out of engagement with the end 70 of the shaft extension 46 which will permit the spring 62 to shift the roller 32 axially so as to separate the slip rings 38 and 40 from the contact pins 22 and 24. The lever 64 thus comprises a switch actuating member which may be shifted between two positions so as to close or open the switch provided by the contact pins 22 and 24 and the slip rings 38 and 40.

The other end 72 of the current conducting cord 34 extends through a slot 76 which is provided in the tube 16 opposite the roller 32 and parallel therewith. A guide 78 is arranged in the slot 76 so as to be slidable along the length thereof. The end 72 of the cord extends through an opening in the guide 78. As the cord 34 is unwound from the roller or reel 32, the guide 78 will move upwardly in the slot 76 and as the cord 34 is wound upon the reel, the guide 78 will move downwardly in its slot. The cord 34 as it is unwound and wound causes the guide 78 to slide in its slot. To unwind the cord, it is only necessary to pull the end to which the plug is attached outwardly from the handle. Pulling on the cord will cause the cord to unwind from the roller 32. When the tension is relaxed, a lever 79 has one end 80 thereof arranged to pinch or bind the cord in the guide 78 so that it cannot recede into the handle under the action of the roller 32 and the spring 50. The lever 79 is pivoted at 82 on a bracket carried by and movable with the guide 78 and a spring 84 is arranged to position the end 80 of the lever so as to grip the cord 34. To wind the cord, the trigger end of the lever 79 is pushed or depressed so as to release the grip of the lever on the cord, whereupon the torsion spring 50 causes the roller 32 to rotate and thereby wind the cord within the handle.

The switch is constructed and arranged so that it may be opened or closed in any position of the roller, as well as during the winding or unwinding of the cord 34.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. In a device of the class described an electric motor driven machine having a hollow handle attached thereto, a cord reel arranged in said handle and including a roller extending lengthwise of said handle and mounted therein for rotary movement about an axis extending lengthwise of said handle, a current conducting cord wound on said roller and having one end thereof attached thereto, means biasing said roller to rotate in a direction to wind said cord on said roller, said handle having an opening therein, the other end of said cord extending through said opening, electrical switch contacts associated with said roller and said handle for transmitting the flow of current through said cord to the motor of said machine, and means for moving said roller axially with respect to said handle for opening and closing said contacts.

2. In a handle for an electric motor driven machine, a mounting member attached to such machine, a tubular member secured at one end thereof to said mounting member, a hand grip associated with the other end of said tubular member, a roller arranged in said tubular member and extending between said mounting member and hand grip, said roller being mounted for rotation about an axis extending lengthwise of said tubular member, a current conducting cord having one end attached to said roller an wound thereon in the space between said roller and handle, said tubular member having an opening therein, the other end of said cord extending through said opening, electrical switch contacts associated with said roller and said handle for transmitting the flow of current through said cord to the motor of said machine, and means for moving said roller axially with respect to said handle for opening and closing said contacts.

3. In a handle for an electric motor driven machine a tubular member forming the stem of said handle, a roller rotatably and slidably mounted in said handle about an axis extending lengthwise of said handle, a current conducting cord wound on said roller and an electric switch arranged for controlling the flow of current through said cord to the motor of said machine, means for moving said roller axially with respect to said handle, said switch being mounted on said handle and arranged to be opened and closed by said axial movement of said roller.

4. In a handle for an electric motor driven machine a tubular member forming the stem of said handle, a roller rotatably and shiftably mounted in said handle about an axis extending lengthwise of said handle, a current conducting cord wound on said roller and an electric switch arranged for controlling the flow of current through said cord to the motor of said machine, resilient means for shifting said roller axially with respect to said handle, said switch being mounted on said handle and arranged to be opened by said shifting movement of said roller, and a lever on said handle operable for shifting said roller against said resilient means to actuate said switch.

5. In a device of the class described, an electric motor-driven machine having a hollow handle pivotally attached thereto and adapted to project upwardly therefrom for moving said machine about a floor, a cord reel arranged within said hollow handle and including a roller extending lengthwise of said handle, said roller being mounted on bearings disposed at opposite ends thereof in said handle for rotary movement about an axis extending lengthwise of said handle, a current conducting cord adapted to be wound upon said roller and having one end thereof attached to said roller and projecting therefrom adjacent the top of said roller whereby said cord will be wound upon said roller from the upper extremity thereof downwardly, a coil spring for driving said roller for winding said cord thereon, said spring being disposed at one end of said roller with the convolutions thereof extending along the axis of said roller, means associated with said roller and said handle for transmitting an electric current to said motor-driven machine through the mounting for said roller, resilient means associated with said roller tending to move said roller axially with respect to said handle for breaking the electrical circuit through said last means, and cam means projecting from said handle for opposing the movement of said roller by said resilient means for closing said circuit.

6. In a device of the class described, an electric motor-driven machine having a hollow handle pivotally attached thereto and adapted to project upwardly therefrom for moving said machine about a floor, a cord reel arranged within said hollow handle and including a roller extending lengthwise of said handle, said roller being mounted on bearings disposed at opposite ends thereof in said handle for rotary movement about an axis extending lengthwise of said handle, a current conducting cord adapted to be wound upon said roller and having one end thereof attached to said roller and projecting therefrom adjacent the top of said roller whereby said cord will be wound upon said roller from the upper extremity thereof downwardly, a coil spring for driving said roller for winding said cord thereon, means associated with said roller and said handle for transmitting an electric current to said motor-driven machine through the mounting for said roller, resilient means associated with said roller tending to move said roller axially with respect to said handle for breaking the electrical circuit through said last means, and cam means projecting from said handle for opposing the movement of said roller by said resilient means for closing said circuit.

7. In a device of the class described, an electric motor-driven machine having a hollow handle pivotally attached thereto and adapted to project upwardly therefrom for moving said machine about a floor, a cord reel arranged within said hollow handle and including a roller extending lengthwise of said handle, said roller being mounted on bearings disposed at opposite ends thereof in said handle for rotary movement about an axis extending lengthwise of said handle, a current conducting cord adapted to be wound upon said roller and having one end thereof attached to said roller and projecting therefrom adjacent the top of said roller whereby said cord will be wound upon said roller from the upper extremity thereof downwardly, means associated with said roller and said handle for transmitting an electric current to said motor-driven machine through the mounting for said roller, resilient means associated with said roller tending to move said roller axially with respect to said handle for breaking the electrical circuit through said last means, and cam means projecting from said handle for opposing the movement of said roller by said resilient means for closing said circuit.

8. In a device of the class described, an electric motor-driven machine having a hollow handle pivotally attached thereto and adapted to project upwardly therefrom for moving said machine about a floor, a cord reel arranged within said hollow handle and including a roller extending lengthwise of said handle, said roller being mounted on bearings disposed at opposite ends thereof in said handle for rotary movement about an axis extending lengthwise of said handle, a current conducting cord adapted to be wound upon said roller and having one end thereof attached to said roller, means associated with said roller and said handle for transmitting an electric current to said motor driven machine through the mounting for said roller, resilient means associated with said roller tending to move said roller axially with respect to said handle for breaking said electrical circuit through said last means, and cam means projecting from said handle for opposing the movement of said roller by said resilient means for closing said circuit.

9. In a device of the class described, an electric motor-driven machine having a handle pivotally attached thereto and adapted to project upwardly therefrom for moving said machine about a floor, a cord reel associated with said handle and including a roller extending lengthwise of said handle, said roller being mounted in said handle for rotary movement about an axis extending lengthwise of said handle, a current conducting cord adapted to be wound upon said roller and having one end thereof attached to said roller and projecting therefrom adjacent the top of said roller whereby said cord will be wound upon said roller from the upper extremity thereof downwardly, means associated with said roller and said handle for transmitting an electric current to said motor-driven machine through the mounting for said roller, and means for moving said roller axially for breaking the electrical circuit through said last means.

RALPH C. OSBORN.

REFERENCES CITED

The following references are of record in the file of this patent:

UNITED STATES PATENTS

| Number | Name | Date |
|---|---|---|
| 938,359 | Wedell | Oct. 26, 1909 |
| 1,387,300 | Oliver et al. | Aug. 9, 1921 |
| 1,659,160 | Richards | Feb. 14, 1928 |
| 1,892,640 | Utley | Dec. 27, 1932 |
| 1,936,463 | Strang | Nov. 21, 1933 |
| 1,953,581 | Ballou | Apr. 3, 1934 |
| 2,016,935 | Strang et al. | Oct. 8, 1935 |